United States Patent
Nisani et al.

(10) Patent No.: US 6,880,004 B2
(45) Date of Patent: *Apr. 12, 2005

(54) METHOD FOR RESTORING A PORTION OF A COMMUNICATION SESSION TRANSMITTED OVER A COMPUTER NETWORK

(75) Inventors: Mordechai Nisani, Tel Aviv (IL); Eitan Bar, Tzoran (IL)

(73) Assignee: STS Software Systems Ltd., Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 10/962,679

(22) Filed: Oct. 13, 2004

(65) Prior Publication Data

US 2005/0033840 A1 Feb. 10, 2005

Related U.S. Application Data

(63) Continuation of application No. 09/664,755, filed on Sep. 19, 2000, which is a continuation-in-part of application No. 09/140,453, filed on Aug. 26, 1998, now Pat. No. 6,122,665.

(51) Int. Cl.[7] .......................................... G06F 15/173
(52) U.S. Cl. ..................... 709/224; 709/204; 379/88
(58) Field of Search .................. 709/224, 204–207, 709/227; 345/302; 379/67, 70, 88

(56) References Cited

U.S. PATENT DOCUMENTS

| 5,101,402 | A | 3/1992 | Chiu et al. |
| 5,351,243 | A | 9/1994 | Kalkunte et al. |
| 5,430,709 | A | 7/1995 | Galloway |
| 5,515,376 | A | 5/1996 | Murthy et al. |
| 5,664,226 | A | 9/1997 | Czako et al. |
| 5,689,641 | A | 11/1997 | Ludwig et al. |
| 5,717,879 | A | 2/1998 | Moran et al. |
| 5,742,833 | A | 4/1998 | Dea et al. |
| 5,848,233 | A | 12/1998 | Radia et al. |
| 5,964,839 | A | 10/1999 | Johnson et al. |
| 6,122,665 | A | 9/2000 | Bar et al. |

FOREIGN PATENT DOCUMENTS

| EP | 0 841 832 A2 | 5/1998 |
| WO | WO-97 41674 A | 11/1997 |
| WO | WO-99 44363 A | 9/1999 |
| WO | WO-00 28425 A | 5/2000 |
| WO | WO-00 52916 A | 9/2000 |

OTHER PUBLICATIONS

Schulzrinne et al.: "RFC 1889: RTP: A Transport Protocol for Real–Time Applications," Network Working Group Request for Comments, Jan. 1996 (complete document, p. 1–75).

Madeline Bodin, "Keeping An eye On Your Agents," Call Center Magazine, Feb. 1993, 4 pages.

Primary Examiner—Dung C. Dinh
(74) Attorney, Agent, or Firm—Hershkovitz & Associates; Abe Hershkovitz

(57) ABSTRACT

Restoring at least a portion of a telephone communication session, in which at least the following occur. Data packets transmitted over a computer network are received. Audio or video data contained in the data packets is stored. The portion of the telephone communication session from the audio or video data contained in the data packets is restored. A terminal having a user interface, a data entry device and a display unit suitable for outputting audio data, video data, or both audio and video is provided. The portion of the telephone communication session is output using the display unit.

11 Claims, 8 Drawing Sheets

METHOD FOR RESTORING A PORTION OF A COMMUNICATION SESSION TRANSMITTED OVER A COMPUTER NETWORK

This application is a continuation of U.S. application Ser. No. 09/664,755, which was filed on Sep. 19, 2000, which is a continuation-in-part of U.S. application Ser. No. 09/140,453, filed on Aug. 26, 1998, now U.S. Pat. No. 6,122,665, issued on Sep. 19, 2000, which are hereby incorporated by reference as if set forth in their respective entireties herein.

FIELD AND BACKGROUND

The present invention is of a method and a system for the management of communication sessions for computer network-based telephone communication, and in particular for the identification of packets containing audio and/or video data, for the storage of these packets, and for the reconstruction of selected communication sessions for audio and/or video display as needed.

The integration of the computer into office communication systems has enabled many functions previously performed by separate devices to be combined into a single management system operated through a computer. For example, computer-based voice logging systems enable a computer to receive voice communication through a hardware connection to the regular telephony network, to record either a conversation, in which at least two parties converse, or a message from at least one party to one or more parties, and to replay these recorded conversations or messages upon request. These voice logging systems can replace mechanical telephone answering machines.

The computer logging systems have many advantages over the mechanical answering machines. For example, the voice messages can be stored in a computer-based storage medium, such as a DAT cassette, which has a greater storage capacity than regular audio cassettes. Furthermore, the stored voice messages can be organized in a database, such that the messages can retrieved according to time, date, channel, dialed number or caller identification, for example. Such organization is not possible with a mechanical telephone answering machine. Thus, computer logging systems for voice messages have many advantages over mechanical answering machines.

Unfortunately, currently available computer logging systems have the disadvantage of being unable to record telephone communication sessions, whether conversations or messages, for voice communication being performed through a LAN (local area network) or a WAN (wide area network). Although these logging systems can play back voice messages to a remote user through a LAN, for example, they cannot record such a message if it is transmitted by a LAN-based telephone. Such LAN and WAN based telephone communication has become more popular recently, since it enables telephone communication to be performed between various parties at physically separated sites without paying for local regular telephony network services, thereby saving money.

Furthermore, LAN and WAN based telephone communication also facilitates the transmission of video as well as audio information. Video information certainly cannot be recorded by currently available computer logging systems. Thus, the inability of computer logging systems to record telephone communication sessions for telephone communication being performed through a LAN or a WAN, including both video and audio data, is a significant disadvantage of these systems.

There is therefore a need for, and it would be highly advantageous to have, a system and a method for recording telephone communication sessions performed over a computer network such as a LAN or a WAN, which would record both audio and video information, organize such information, and then display such information upon request.

SUMMARY OF THE INVENTION

It is one object of the present invention to provide a system and a method for recording communication sessions performed over a computer network.

It is another object of the present invention to provide such a system and method for analyzing data transmitted over the computer network in order to detect audio and video data for recording.

It is still another object of the present invention to provide such a system and method for displaying recorded video and audio data upon request.

It is yet another object of the present invention to provide such a system and method for analyzing, recording and displaying communication sessions conducted with a LAN-based telephone system.

These and other objects of the present invention are explained in further detail with regard to the drawings, description and claims provided below.

The present invention provides a system and a method for analyzing data packets on a computer network, for selectively recording audio and video data packets, for organizing this stored information and for displaying the stored information upon request, such that communication sessions with computer network-based "telephone" systems can be logged.

According to the teachings of the present invention, there is provided a system for managing a communication session over a computer network, the system comprising: (a) a network connector for connecting to the computer network and for receiving data packets from the computer network; (b) a filtering unit for filtering the data packets and for accepting the data packets substantially only if the data packets contain data selected from the group consisting of audio data and video data, such that the data packets form at least a portion of the communication session and such that the data packets are selected data packets; (c) a management unit for receiving the selected data packets and for storing the selected data packets, such that the selected data packets are stored data packets; and (d) a storage medium for receiving and for storing the stored data packets from the management unit, such that the at least a portion of the communication session is stored.

Preferably, the system further comprises (e) a data restore unit for retrieving and displaying the at least a portion of the communication session, the data restore unit requesting the data packets from the storage medium through the management unit, and the data restore unit reconstructing the data packets for displaying the at least a portion of the communication session.

More preferably, the data restore unit further comprises a communication session display unit for displaying the at least a portion of the communication session. Most preferably, the communication session display unit is selected from the group consisting of a video unit and an audio unit.

According to preferred embodiments of the present invention, the system further comprises (f) a database connected to the filtering unit for storing filtering information, the filtering information including at least one IP address of a party whose communication sessions are monitored; wherein the filtering unit accepts the data packets according to the filtering information, such that the filtering unit substantially only accepts the data packets if the data packets fulfill the filtering information.

Preferably, the system further comprises (g) a user computer for receiving at least one command of a user and for displaying information to the user, such that the user determines the filtering information according to the at least one command of the user.

More preferably, the computer network is selected from the group consisting of a LAN (local area network) and a WAN (wide area network). Most preferably, the computer network is a LAN (local area network).

According to further preferred embodiments of the present invention, the LAN is divided into at least two segments, the system further comprising: (h) a local management unit for each segment, the local management unit including the filtering unit and the management unit; and (i) a central management unit for controlling the local management units, the central management unit controlling storage in the storage medium.

Preferably, the network connector is a network interface card.

According to another embodiment of the present invention, there is provided a method for storing at least a portion of a communication session performed on a computer network, the communication session being performed between a packet source and a packet destination, the steps of the method being performed by a data processor, the method comprising the steps of: (a) receiving a data packet from the packet source on the computer network; (b) analyzing the data packet to determine if the data packet is an IP packet; (c) if the data packet is the IP packet, filtering the IP packet to determine a type of the IP packet; and (d) storing the IP packet to form a stored data packet according to the type, such that the stored data packet forms at least a portion of the communication session. Preferably, the step of analyzing the data packet is performed by examining a header of the data packet.

According to a preferred embodiment of the present invention, the step of filtering the IP packet is performed by examining the header of the IP packet.

Preferably, the step of filtering the IP packet further comprises the steps of: (i) examining the header of the IP packet to determine an IP address of the packet source; (ii) determining if the IP address is a recorded IP address; (iii) passing the IP packet to form a passed IP packet substantially only if the IP address is the recorded IP address; and (iv) alternatively, dumping the IP packet.

More preferably, the step of determining if the IP address is the recorded IP address is performed by comparing the IP address to a list of IP addresses from packet sources, such that if the IP address is included in the list, the IP address is the recorded IP address.

Also preferably, the step of filtering the IP packet further comprises the steps of: (v) determining whether the passed IP packet is an H.225 packet, a H.245 packet, an RTP packet or an RTCP packet; (vi) if the type of the passed IP packet is the H.225 packet, determining whether the H.225 packet is a setup packet or a connect packet; (vii) if the H.225 packet is the setup packet, setting a status flag as "start session request"; (viii) alternatively, if the H.225 packet is the connect packet and the status flag is "start session request", storing at least one detail of the communication session; and (ix) setting the status flag as "wait for logic channel".

More preferably, the step of filtering the IP packet further comprises the steps of: (x) alternatively, if the type of the passed IP packet is the H.245 packet, determining whether the H.245 packet is an open logical channel request packet, an open logical channel acknowledgment packet or a terminal capability set packet; (xi) if the H.245 packet is the open logical channel request packet and the status flag is "wait for logic channel", setting the status flag as "wait for acknowledgment"; (xii) alternatively, if the H.245 packet is the open logical channel acknowledgment packet and the status flag is "wait for acknowledgment", performing the steps of: (A) setting the status flag as "wait for terminal capability"; and (B) saving a transport address of the destination of the communication session; and (xiii) also alternatively, if the H.245 packet is the terminal capability set packet, performing the steps of: (A) storing a capability of the packet destination from the terminal capability packet; and (B) setting the status flag as "in call process".

Most preferably, if the status flag is "in call process" and the type of the passed IP packet is the RTP packet, the RTP packet is stored. Also most preferably, if the status flag is "in call process" and the type of the passed IP packet is the RTCP packet, the RTCP packet is stored.

According to another preferred embodiment of the present invention, the method further comprises the steps of: (e) retrieving the stored data packet to form a retrieved data packet; and (i) reconstructing at least a portion of the communication session according to the retrieved data packet.

Preferably, the step of retrieving the data packet includes the steps of: (i) receiving a source IP address of the packet source, a start time of the communication session, and an end time of the communication session; and (ii) selecting at least one communication session according to the source IP address, the start time and the end time.

Also preferably, the step of reconstructing at least a portion of the communication session includes displaying audio data.

Alternatively and also preferably, the step of reconstructing at least a portion of the communication session includes displaying video data.

More preferably, the step of reconstructing at least a portion of the communication session further comprises the steps of: (i) retrieving substantially only RTP packets; (ii) examining a header of the RTP packets to determine a time stamp for each of the RTP packets; and (iii) displaying the RTP packets in an order according to the time stamp.

Hereinafter, the term "communication session" includes both a conversation, in which at least two parties converse by exchanging audio and/or video information in "real time", and a message, in which at least one party records such audio and/or video information for reception by at least one other party at a later date.

Hereinafter, the term "Internet" is used to generally designate the global, linked web of thousands of networks which is used to connect computers all over the world. As used herein, the term "intranet" includes other types of computer networks, such as LAN (local area networks) or WAN (wide area networks). The term "computer network" includes any connection between at least two computers which permits the transmission of data, including both Internet and intranet. The term "regular telephony network" includes POTS (plain old telephone system) and substantially any other type of telephone network which provides services through a regular telephone services provider, but which specifically excludes audio and/or video communication performed through any type of computer network.

Hereinafter, the term "computer" includes, but is not limited to, personal computers (PC) having an operating system such as DOS, Windows™, OS/2™ or Linux; MacIntosh™ computers; computers having JAVA™-OS as the operating system; and graphical workstations such as the computers of Sun Microsystems™ and Silicon Graphics™, and other computers having some version of the UNIX operating system such as AIX or SOLARIS™ of Sun Microsystems™; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., USA).

Hereinafter, the term "logging" refers to the process of analyzing data packets on a network to locate audio and/or video data, and of recording such data in an organized system. Hereinafter, the term "display" includes both the visual display of video data, and the production of sound for audio data.

BRIEF DESCRIPTION OF THE DRAWINGS

The invention is herein described, by way of example only, with reference to the accompanying drawings, wherein.

DESCRIPTION OF BACKGROUND ART

Figure 1:
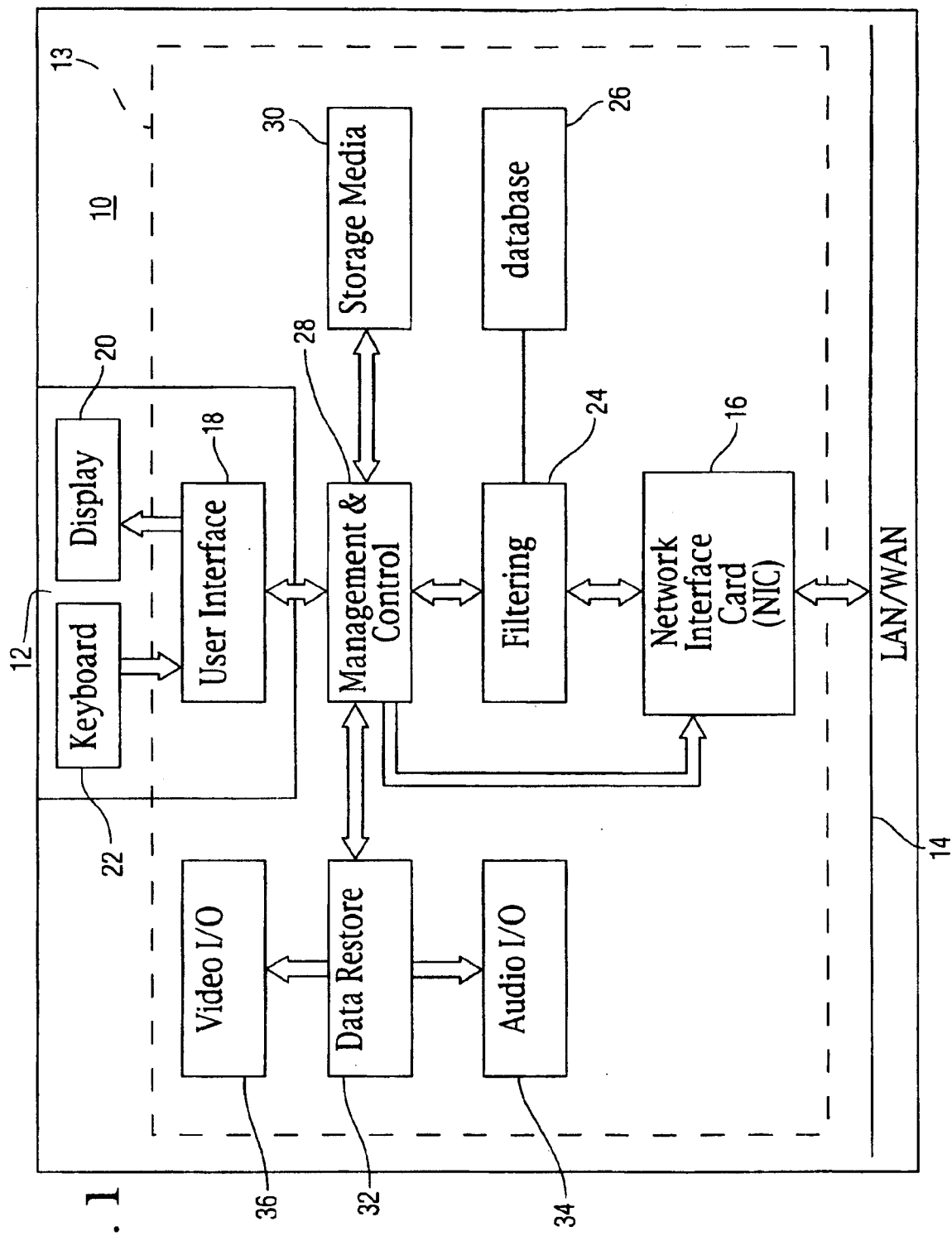
FIG. 1 is a schematic block diagram of an exemplary communication session monitoring system according to the present invention.

The following description is intended to provide a description of certain background methods and technologies which are optionally used in the method and system of the present invention. The present invention is specifically not drawn to these methods and technologies alone. Rather, they are used as tools to accomplish the goal of the present invention, which is a system and a method for analyzing data packets on a computer network, for selectively recording audio and video data packets, for organizing this stored information and for displaying the stored information upon request, such that communication sessions with computer network-based "telephone" systems can be logged.

The system and method of the present invention is particularly intended for operation with computer networks constructed according to the ITU-T Recommendation H.323 for visual telephone systems and equipment for local area networks which provide a non-guaranteed quality of service. Recommendation H.323 is herein incorporated by reference in order to further describe the hardware requirements and operating protocols for such computer networks, and is hereinafter referred to as "H.323".

H.323 describes terminals, equipment and services for multimedia communication over Local Area Networks (LAN) which do not provide a guaranteed quality of service. Computer terminals and equipment which fulfill H.323 may carry real-time voice, data and video, or any combination, including videotelephony.

The LAN over which such terminals communicate can be a single segment or ring, or optionally can include multiple segments with complex topologies. These terminals are optionally integrated into computers or alternatively are implemented in stand-alone devices such as videotelephones. Support for voice data is required, while support for general data and video data are optional, but if supported, the ability to use a specified common mode of operation is required, so that all terminals supporting that particular media type can communicate. The H.323 Recommendation allows more than one channel of each type to be in use. Other Recommendations in the H.323-Series which are also incorporated by reference include H.225.0 packet and synchronization; H.245 control, H.261 and H.263 video codecs, G.711, G.722, G.728, G.729, and G.723 audio codecs, and the T.120-Series of multimedia communications protocols.

ITU-T Recommendation H.245.0 covers the definition of Media stream packetization and synchronization for visual telephone systems. ITU-T Recommendation H.245.0 defines the Control protocol for multimedia communications, and is hereinafter referred to as "H.245". H.245 is incorporated by reference as is fully set forth herein.

The logical channel signaling procedures of H.245 describes the content of each logical channel when the channel is opened. Procedures are provided for the communication of the functional capabilities of receivers and transmitters, so that transmissions are limited to information which can be decoded by the receivers, and so that receivers may request a particular desired mode from transmitters.

H.245 signaling is established between two endpoints: an endpoint and a multipoint controller, or an endpoint and a Gatekeeper. The endpoint establishes exactly one H.245 Control Channel for each call that the endpoint is participating in. The channel must then operate according to H.245. Support for multiple calls and hence for multiple H.245 Control Channels is possible.

The RAS signaling function uses H.225.0 messages to perform registration, admissions, bandwidth changes, status, and disengage procedures between endpoints and Gatekeepers. In LAN environments that do not have a Gatekeeper, the RAS Signaling Channel is not used. In LAN environments which contain a Gatekeeper, such that the LAN includes at least one Zone, the RAS Signaling Channel is opened between the endpoint and the Gatekeeper. The RAS Signaling Channel is opened prior to the establishment of any other channels between H.323 endpoints.

The call signaling function uses H.225.0 call signaling to establish a connection between two H.323 endpoints. The Call Signaling Channel is independent from the RAS Channel and the H.245 Control Channel. The Call Signaling Channel is opened prior to the establishment of the H.245 Channel and any other logical channels between H.323 endpoints. In systems that do not have a Gatekeeper, the Call Signaling Channel is opened between the two endpoints involved in the call. In systems which contain a Gatekeeper, the Call Signaling Channel is opened between the end point and the Gatekeeper, or between the endpoints themselves as chosen by the Gatekeeper.

DESCRIPTION OF THE PREFERRED EMBODIMENTS

The present invention provides a system and a method for analyzing data packets on a computer network, for selectively recording audio and video data packets, for organizing this stored information and for displaying the stored information upon request, such that communication sessions with computer network-based "telephone" systems can be logged.

The principles and operation of a method and a system according to the present invention may be better understood with reference to the drawings and the accompanying description.

Referring now to the drawings, FIG. 1 is a block diagram of an exemplary system for logging and displaying audio and/or visual data from communication sessions performed over a computer network. A computer logging system 10 features a user computer 12 connected to a communication session management unit 13. Communication session management unit 13 is in turn connected to an intranet 14 through a network interface card (NIC) 16.

User computer 12 includes a user interface 18, which is preferably a GUI (graphical user interface), which is displayed on a display unit 20. User interface 18 preferably enables the user to enter such information as the definition of the parties whose calls should to be monitored and/or logged, and which also preferably enables the user to enter at least one command for retrieving and displaying a communication session.

Display unit 20 is preferably a computer monitor. The user is able to interact with user computer 12 by entering data and commands through a data entry device 22. Data entry device 22 preferably includes at least a keyboard or a pointing device such as a mouse, and more preferably includes both a keyboard and a pointing device. According to one preferred embodiment of the present invention, user computer 12 is a PC (personal computer). Alternatively and preferably, user computer 12 is a "thin client" such a net computer which is a computer able to communicate on an IP-based network. One example of such a net computer is the JavaStation™ (Sun Microsystems). The advantage of such net computers is that they allow the user to interact with complex, sophisticated software programs, yet generally do not have all of the powerful computing capabilities of currently available PC computers.

Intranet 14 could be a LAN or a WAN, for example. The connection between communication session management unit 13 and intranet 14 occurs through NIC 16. NIC 16 is preferably any standard, off-the-shelf commercial product which enables communication session management unit 13 to be connected to any suitable computer network (for example, Etherlink II ISA/PCMCIA Adapter or Etherlink III PCI Bus-Master Adapter (3c590) of 3-Com™, or NE2000 Adapter of Novell™ or any other such suitable product). Examples of such suitable computer networks include, but are not limited to, any standard LAN such as Ethernet (IEEE Standard 802.3), Fast Ethernet (IEEE Standard 802.10), Token Ring (IEEE Standard 802.5) and FDDI.

All data packet traffic on intranet 14 is passed to a filtering module 24 through NIC 16. As shown in more detail in FIG. 3 below, filtering module 24 screens the data packets in order to determine which data packets fulfill the following criteria. Briefly, the data packets should be IP packets with headers according to the H.225 and H.245 standards, indicating voice and/or video traffic. As noted previously, these standards define media stream packet construction and synchronization for visual telephone systems and the control protocol for multimedia communications.

Filtering module 24 then preferably passes substantially only those data packets which meet these criteria to a management module 28. In the Zone Configuration of the system of the present invention, shown in FIG. 7 below, filtering module 24 preferably also transfers messages from other communication session management units.

Management module 28 receives the data packets passed through by filtering module 24, and analyzes the received data packets. Optionally and preferably, a database 26 stores such information as the IP addresses of parties whose communication sessions should be logged, as well as the conversion table associating each party with at least one IP address, for example. The stored list of IP addresses representing those parties whose calls should be logged is preferably user-defined. As used herein, the term "party" refers to a person or persons communicating through a computer network-based telephone system. The latter preferred requirement significantly reduces the amount of data stored by including only data which is of interest to the user. Management module 28 analyzes and manages data in accordance with the applicable H.225 and H.245 specifications, including the H.245 control function, RAS signaling function and call signaling function, substantially as described above in the "Description of the Background Art" section.

Management module 28 analyzes the packets in order to determine the specific communication session to which the data packets belong, the type of data compression being used (if any), and whether the data packets were sent from an IP address which should be monitored. Management module 28 must perform this analysis since filtering module 24 simply passes all data packets which fulfill the criteria described briefly above (see FIGS. 3A–3D for more detail). Since these packets are passed without regard to any of the information stored in database 26, management module 28 must compare the rules of database 26 to the information present in the packet header of each packet in order to determine whether the received packet should be stored.

Those received packets which fulfill the rules of database 26 are then stored in a storage medium 30, which is preferably a high capacity digital data storage device such as a hard disk magnetic storage device, an optical disk, a CD-ROM, a ZIP or DVD drive, or a DAT cassette, or a combination of such devices according to the operational needs of specific applications, or any other suitable storage media. Preferably, the specific communication session or "telephone call", with which each data packet is associated, is also stored in order for that session to be reconstructed and displayed at a later time.

Upon request by the user, management module 28 can then retrieve one or more data packets from storage medium 30 which are associated with one or more communication sessions. The retrieved packet or packets are then transferred to a data restore module 32. Data restore module 32 is preferably capable of manipulating these retrieved packets to restore a particular communication session by using the RTP (Real Time Protocol). As described in further detail below with regard to FIGS. 4C and 5, in those systems which follow the RTP, the data packets are sent with a time stamp in the header rather than just a sequence number. Such a time stamp is necessary for audio and video stream data, in order for the data packets to be reassembled such that the overall timing of the stream of data is maintained. Without such a time stamp, the proper timing would not be maintained, and the audio or video streams could not be accurately reconstructed.

The communication sessions are restored from the reconstructed streams of data packets by using the applicable audio and/or video CODEC's. A CODEC is a non-linear method for the conversion of analog and digital data. Thus, an audio CODEC enables the digitized audio data in relevant data packets to be converted to analog audio data for display to the user as audible sounds, for example. Suitable CODEC's are described in greater detail below with regard to FIG. 5.

In order for the user to receive the display of the reconstructed communication session, system 10 preferably features an audio unit 34 and a video unit 36, collectively referred to as a "communication session display unit". More preferably, both audio unit 34 and video unit 36 are capable of both receiving audio or video input, respectively, and of displaying audio or video output. At the very least, audio unit 34 and video unit 36 should be able to display audio or video output, respectively. For example, audio unit 34 could optionally include an microphone for input and a speaker or an earphone for output. Video unit 36 could optionally include a video monitor or display screen for output and a video camera for input, for example.

Figure 2:
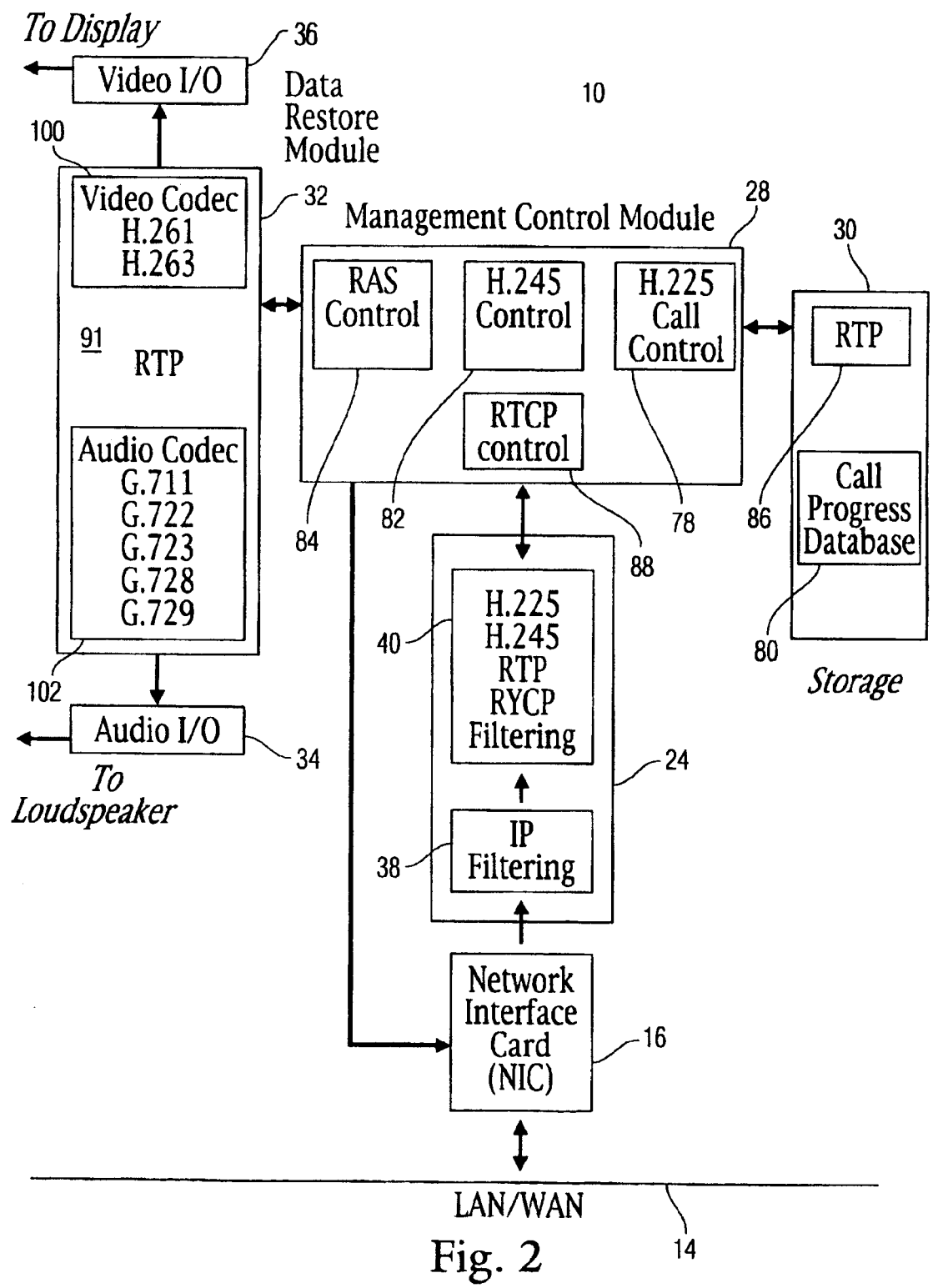
FIG. 2 is a schematic block diagram of the software modules required for operating the system of FIG. 1.

FIG. 2 is a schematic block diagram of system 10 of FIG. 1, showing the overall system of software modules of system 10 in more detail. Reference is also made, where appropriate, to flow charts showing the operation of these software modules in more detail (FIGS. 3A–3D and FIG. 5), as well as to descriptions of the headers of the different types of data packets (FIGS. 4A–4D).

As shown, system 10 again includes a connection to intranet 14 through NIC 16. As the packets are transmitted through intranet 14, NIC 16 intercepts these data packets and passes them to filtering module 24.

Figure 4A:
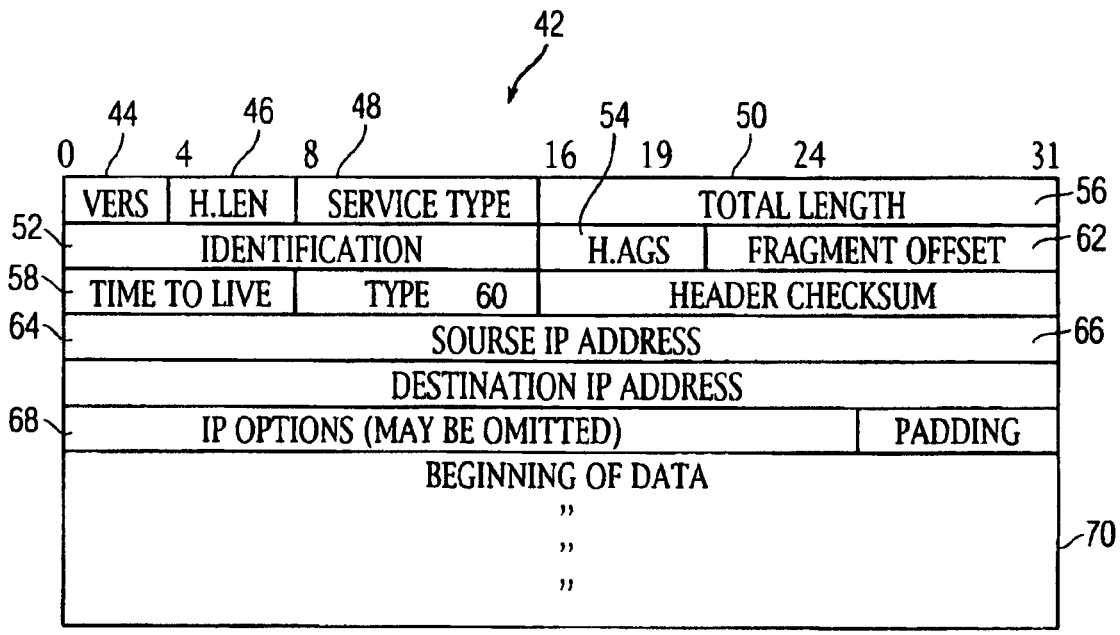
FIGS. 4A–4D are schematic block diagrams showing the headers of H.225 (FIG. 4A), H.245 (FIG. 4B), RTP (FIG. 4C) and RTCP (FIG. 4D) packets, as they relate to the present invention.
Figure 4B:
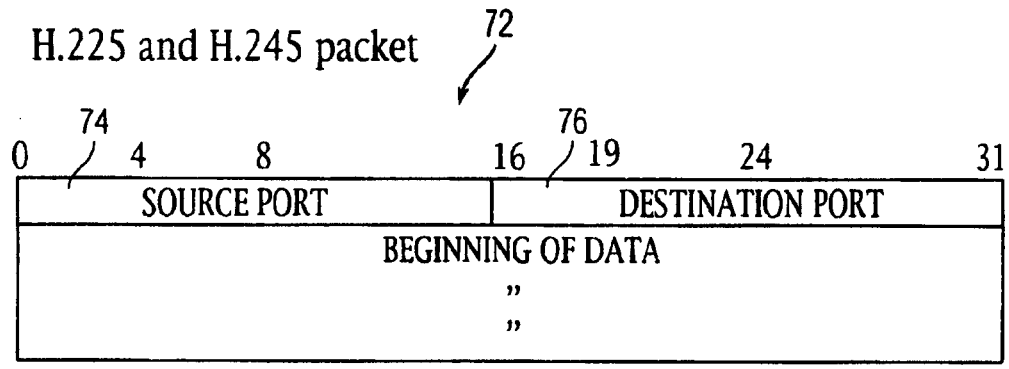

Filtering module 24 has two components. A first filtering component 38 examines the header of the data packet, which should be an IP type packet with the correct header, as shown in FIG. 4A below. Next, first filtering component 38 passes the data packet to a second filtering component 40. Second filtering component 40 then determines the type of IP data packet, which could be constructed according to the H.225, H.245, RTP or RTCP standards.

Figure 3A:
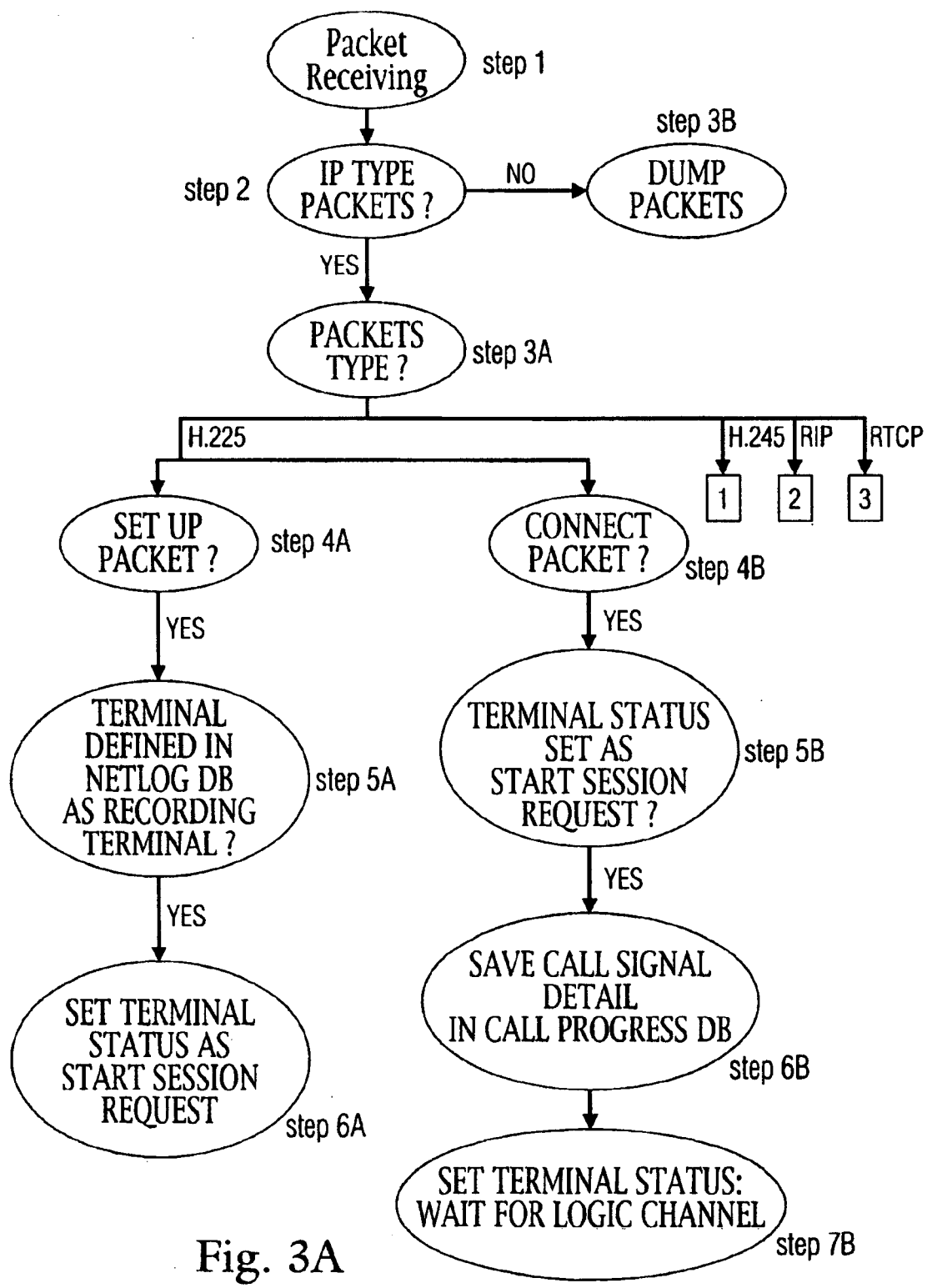
FIGS. 3A–3D are flowcharts of exemplary filtering and recording methods according to the present invention.

As shown with reference to FIG. 3A, first filtering component 38 and second filtering component 40 operate as follows. In step one, a packet is received by filtering module 24. The packet is given to first filtering component 38, which then determines whether the packet is an IP type packet in step two. Such a determination is performed according to the structure of the header of the data packet, an example of which is shown in FIG. 4A. A header 42 is shown as a plurality of boxes, each of which represents a portion or "field" of the header. The number of bytes occupied by each portion is also shown, it being understood that each layer consists of 32 bits. The first portion of the header, a "VERS" portion 44, is the protocol version number. Next, an "H. LEN" portion 46 indicates the number of 32-bit quantities in the header. A "SERVICE TYPE" portion 48 indicates whether the sender prefers the datagram to travel over a route with minimal delay or a route with maximal throughput. A "TOTAL LENGTH" portion 50 indicates the total number of octets in both the header and the data.

In the next layer, an "IDENTIFICATION" portion 52 identifies the packet itself. A "FLAGS" portion 54 indicates whether the datagram is a fragment or a complete datagram. A "FRAGMENT OFFSET" portion 56 species the location of this fragment in the original datagram, if the datagram is fragmented. In the next layer, a "TIME TO LIVE" portion 58 contains a positive integer between 1 and 255, which is progressively decremented at each route traveled. When the value becomes 0, the packet will no longer be passed and is returned to the sender. A "TYPE" portion 60 indicates the type of data being passed. A "HEADER CHECKSUM" portion 62 enables the integrity of the packet to be checked by comparing the actual checksum to the value recorded in portion 62.

The next layer of header 42 contains the source IP address 64, after which the following layer contains the destination IP address 66. An optional IP OPTIONS portion 68 is present, after which there is padding (if necessary) and a data portion 70 of the packet containing the data begins.

The structure of the header of the data packet is examined by first filtering component 38 to determine whether this header has the necessary data fields in the correct order, such that the header of the data packet has a structure according to header 42. First filtering component 38 only allows those packets with the correct header structure to pass, as shown in step 3A. Otherwise, the packets are dumped as shown in step 3B.

Figure 3B:
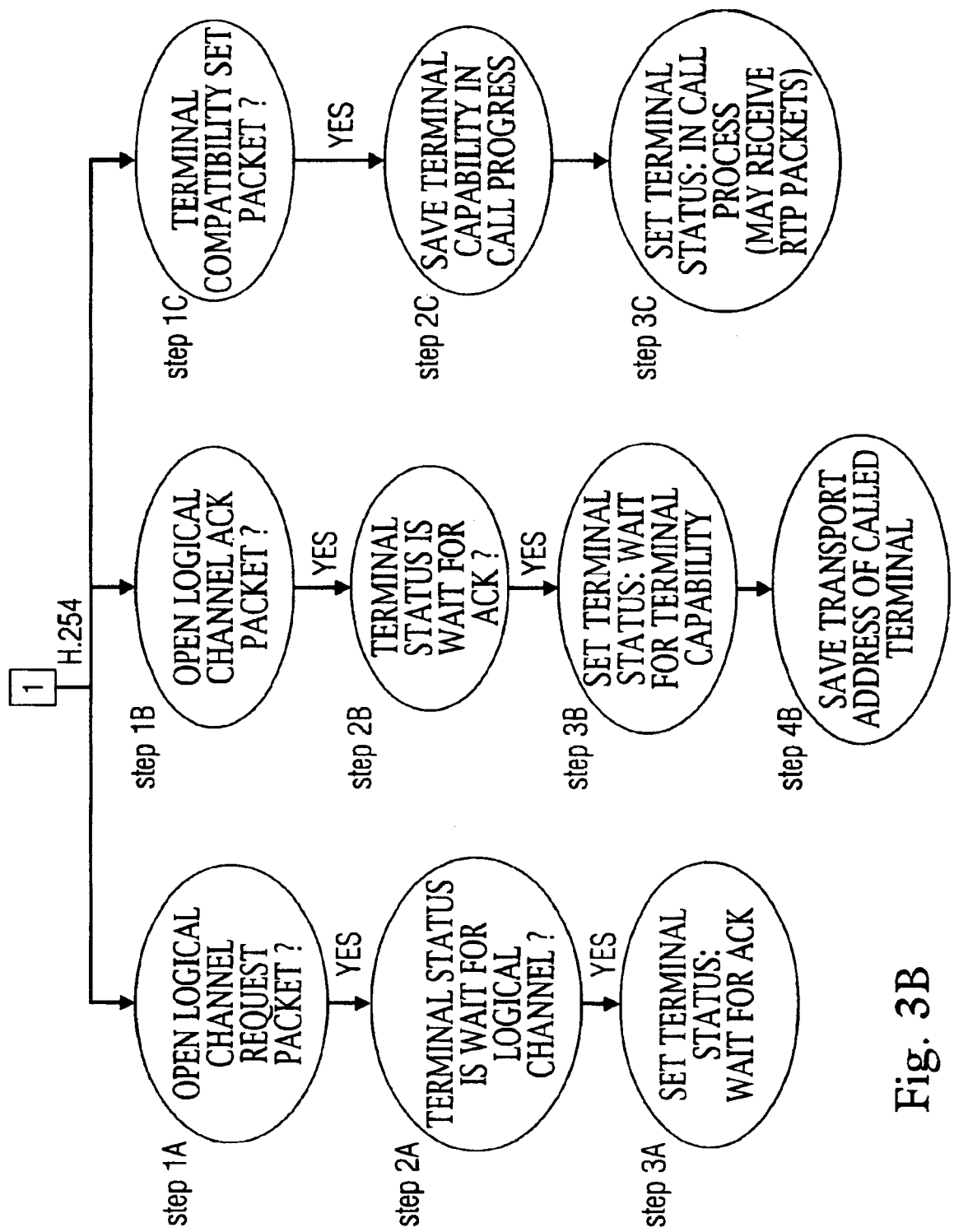
Figure 3C:
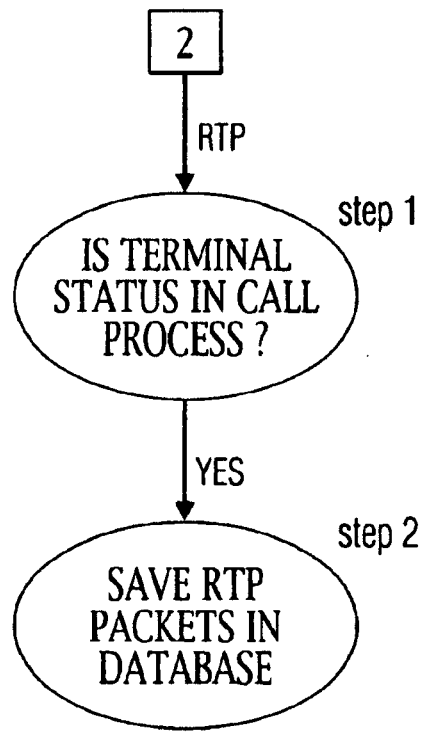
Figure 3D:
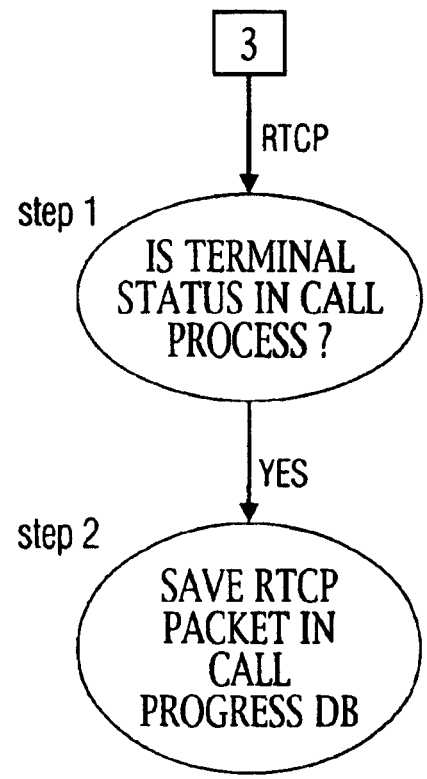

Those packets with the correct header, or "IP packets", are then passed to second filtering component 40. Second filtering component 40 then performs the remainder of the filtering steps. In step 3A, second filtering component 40 examines the IP packets to determine their type from the data portion of the packet as shown in FIG. 4A. The packets could be in one of four categories: H.225, H.245, RTP and RTCP. The steps of the method for H.225 packets are shown in FIG. 3A, while the procedures for the remaining packet types are shown in FIGS. 3B–3D, respectively.

Once the type of the packet has been determined, both the packet itself and the information regarding the type of packet are both passed to management module 28, as shown in FIG. 2. The packet is then passed to the relevant component within management module 28, also as shown in FIG. 2, for the recording process to be performed. The recorded packets are stored in storage module 30, as described in greater detail below with regard to FIGS. 3C and 3D.

If the packet has been determined to be an H.225 packet according to the header of the packet (see FIG. 4B), the packet is passed to an H.225 call control module 78 within management module 28, as shown in FIG. 2. The steps of the management method are as follows, with reference to FIG. 3A. In step 4A of FIG. 3A, the H.225 packet is examined to see if it is a setup packet, which is determined according to the structure of the data in the packet. This structure is specified in the H.225.0 recommendation, and includes at least the following types of information:

protocolIdentifier (the version of H.225.0 which is supported);

h245Address (specific transport address on which H.245 signaling is to be established by the calling endpoint or gatekeeper);

sourceAddress (the H.323.sub.—ID's for the source);

sourceInfo (contains an EndpointType to enable the party being called to determine whether the call includes a gateway or not); and destinationaddress (this is the address to which the endpoint wants to be connected).

Other types of data are also required, as specified in the H.225.0 Recommendation. This data structure enables H.225 call control module 78 to determine whether the packet is a setup packet.

If this packet is a setup packet, then the first branch of the method is followed. The source port is taken from a source port field 74 of an H.225 header 72, and the destination port is taken from a destination port field 76 (see FIG. 4B). In step 5A, database 26 of FIG. 1 is then examined to determine whether either of the corresponding terminals is defined as a recording terminal; that is, whether communication sessions initiated by the IP address of this terminal should be monitored. If true, then in step 6A, the terminal status is set as a start session request from the terminal corresponding to the source port.

Alternatively, the packet is examined to see if it is a connect packet in step 4B, which is determined according to the structure of the data in the packet. This structure is specified in the H.225.0 recommendation, and includes at least the following types of information:

protocolIdentifier (the version of H.225.0 which is supported);

h245Address (specific transport address on which H.245 signaling is to be established by the calling endpoint or gatekeeper);

destinationInfo (contains an EndpointType to enable the caller to determine whether the call includes a gateway or not); and conferenceID (contains a unique identifying number to identify the particular conference).

If the packet is a connect packet, then the second branch of the method is followed. In step 5B, the flag indicating the terminal status is examined to determine if the terminal status is set as a start session request. In step 6B, the details of the call signal are saved in a call progress database 78 of storage medium 30 (see FIG. 2). These details preferably include the source and destination IP addresses, the source and destination ports; the time at which the communication session was initiated, and any other relevant information. In step 7B, the status of the terminal is set to "wait for the logic channel".

If the packet has been determined to be an H.245 packet by second filtering component 40, the packet is passed to an H.245 call control module 82 within management module 28, as shown in FIG. 2. Such H.245 packets are necessary for H.245 signaling. H.245 signaling is established between two endpoints: an endpoint and a multipoint controller, or an endpoint and a Gatekeeper (see FIGS. 6 and 7 below for examples and a description of such endpoints). Each endpoint is capable of calling and of being called as part of a communication session. However, the system of the present invention only monitors, rather than initiating, such communication sessions. Thus, the system of the present invention uses the H.245 signaling to determine when the communication session has started in order to effectively record the necessary data packets for the storage and later reconstruction of the session.

The steps of the management method for H.245 packets are as follows, with reference to FIG. 3B. In step 1A of FIG. 3B, the H.245 packet is examined to determine if it is an open logical channel request packet. If it is, then in step 2A, the terminal status is examined to determine if the status is "wait for the logical channel". If so, then in step 3A the terminal status is set to "wait for acknowledgment".

Alternatively, the H.245 packet is examined to determine if it is an open logical channel acknowledgment packet, as shown in step 1B. If it is, then in step 2B, the terminal status is examined to determine if the status is "wait for acknowledgment". If so, then in step 3B the terminal status is set to "wait for terminal capability". In step 4B, the transport address of the "called" or destination terminal is saved. This transport address is taken from the destination port field 76 of header 72 (see FIG. 4B). It should be noted that H.225 and H.245 packets have identical header structures.

Also alternatively, the H.245 packet is examined to determine if it is a terminal capability set packet, as shown in step 1C. If it is, then in step 2C, the terminal capability is saved in call progress database 80 (see FIG. 2). In step 3C, the terminal status is set to "in call process", such that the communication session has been determined to be opened and such that management module 28 can now receive RTP data packets.

Figure 4C:
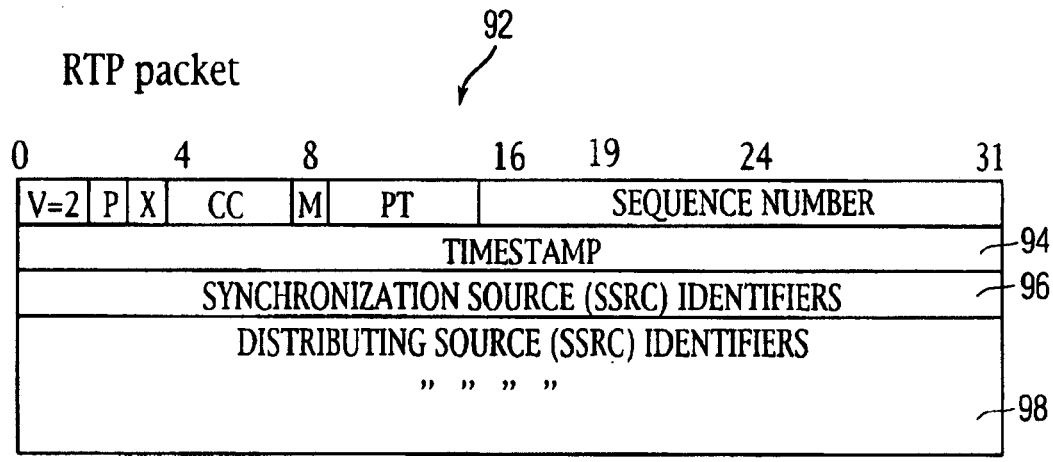

If the packet has been determined to be a RTP packet by second filtering component 40, the packet is passed to a RAS (registration, admissions and status) control module 84 within management module 28, as shown in FIG. 2. The steps of the management method for RTP packets are as follows, with reference to FIG. 3C. In step 1 of FIG. 3C, the terminal status is examined to see if it is "in call process". If so then in step 2, the RTP packets are saved in a RTP database 86 within storage medium 30 (see FIG. 2). FIG. 4C shows the structure of the RTP packet header, which can be used to identify the communication session from which the packet was taken.

Figure 4D:
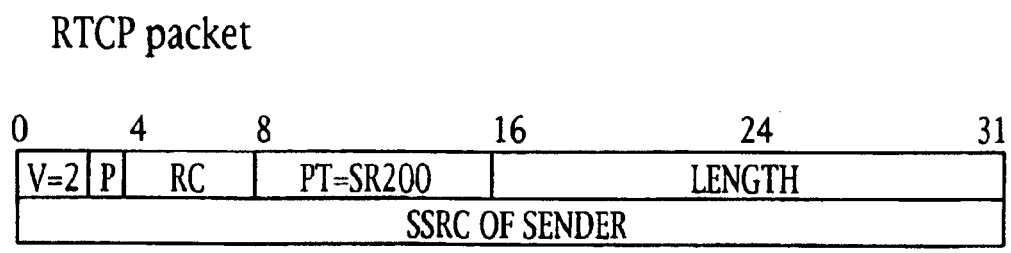

Finally, if the packet has been determined to be a RTCP packet by second filtering component 40, the packet is passed to a RTCP control module 88 within management module 28, as shown in FIG. 2. The steps of the management method for RTCP packets are as follows, with reference to FIG. 3D. In step 1 of FIG. 3D, the terminal status is examined to see if it is "in call process". If so then in step 2, the RTCP packets are saved in call progress database 80 within storage medium 30 (see FIG. 2). FIG. 4D shows the structure of the RTCP packet header, which can be used to identify the communication session from which the packet was taken.

Thus, FIGS. 3A–3D illustrate the method of the present invention with regard to the filtering and storage of data packets which constitute the recorded communication session, as recorded by the system of the present invention as shown in FIGS. 1 and 2. Of course, in addition to recording such communication sessions, the system of the present invention is also able to retrieve and to replay these communication sessions to the user. The stored communication session, composed of stored data packets, can be retrieved and displayed by data restore unit 32 of FIG. 2, in conjunction with audio unit 34 and video unit 36. The method of retrieving and replaying sessions of interest is shown in FIG. 5, while certain other relevant portions of the system of the present invention are shown in FIG. 2.

Figure 5:
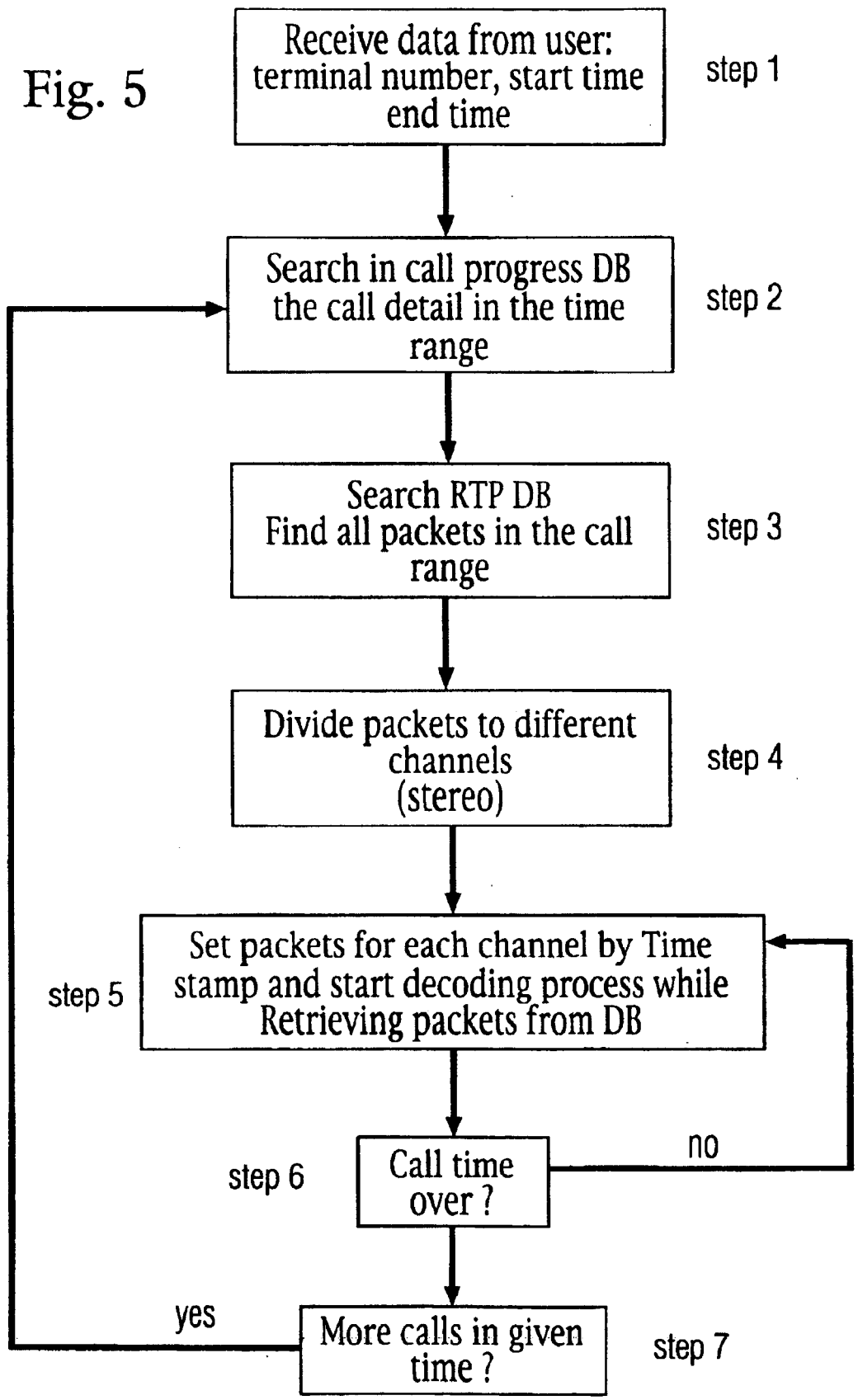
FIG. 5 is a flowchart of an exemplary communication session playback method according to the present invention.

In step 1 of FIG. 5, the user inputs the information concerning the communication session which is to be retrieved and replayed. This information preferably includes the terminal number, or other designation information concerning at least one of the parties of the communication session of interest; the time at which the session started; and the time at which the session ended. However, alternatively other information could be included in place of this information, as long as sufficient information is provided for the communication session of interest to be identified.

In step 2 of FIG. 5, call progress database 80 (see FIG. 2) is searched by data restore unit 32 in order to find the details of the communication session(s) in the specified time range.

These details are then compared to the information entered by the user to locate at least one communication session of interest in the call range.

In step 3, RTP database 86 of storage medium 30 (see FIG. 2) is searched, again by data restore unit 32, to find substantially all data packets from the at least one communication session in the specified call range. Optionally and preferably, in step 4, if the audio portion communication session was recorded in stereo, then the data packets are divided into different audio channels.

In step 5, the data packets are restored by data restore unit 32 by an RTP (Real Time Protocol) software module 91 within data restore unit 32. RTP software module 91 orders the data packets within each channel according to the time stamp of each packet. As shown in FIG. 4C, an RTP packet header 92 features several important fields: a timestamp field 94, a synchronization source (SSRC) identifiers field 96 and a contributing source (CSRC) identifiers field 98. SSRC field 96 is used to determine the source of the RTP packets (the sender), which has a unique identifying address (the SSRC identifier). The CSRC identifier in CSRC field 98 is used in a conference with multiple parties, and indicates the SSRC identifier of all parties. Timestamp field 94 is used by RTP software module 91 to determine the relative time at which the data in each packet should be displayed.

For example, preferably the audio stream data of the audio speech of one person is synchronized to that person's lip movements as shown in the video stream, a process known as "lip synchronization". Such synchronization requires more than simply replaying audio and video data at certain relative time points, since the audio and video data packets may not arrive at the same time, and may therefore have slightly different timestamps.

Once the data packet has been correctly synchronized, the control of the display of the audio data is then performed by an audio component 102 of data restore unit 32 according to one or more audio CODEC's (see FIG. 2). The control of the display of the video data is then performed by a video component 104 of data restore unit 32 according to one or more video CODEC's (see FIG. 2).

Suitable CODEC's include, but are not limited to, an audio codec using CCITT Recommendation G.711(1988), Pulse Code Modulation (PCM) of voice frequencies; an audio codec using CCITT Recommendation G.722 (1988), 7 kHz audio-coding within 64 kbit/s; an audio codec using ITU-T Recommendation G.723.1 (1996), Speech coders: Dual rate speech coder for multimedia communications transmitting at 5.3. and 6.3 Kbps; an audio codec using CCITT Recommendation G.728 (1992), Coding of speech at 16 Kbps using low-delay code excited linear prediction; an audio codec using ITU-T Recommendation G.729 (1996), Coding of speech at 8 Kbps using conjugate structure algebraic code-excited linear-prediction (CS-ACELP); a video codec using ITU-T Recommendation H.261 (1993), Video codec for audiovisual services at p×64 kbit/s; a video code using ITU-T Recommendation H.263 (1996), Video coding for low bit rate communication; and substantially any other similar coding standard.

As shown in FIG. 2, the audio data is displayed by audio unit 34, which could include a loudspeaker, for example. The video data is displayed by video unit 36, which could include a display monitor screen, for example. Step 5 of FIG. 5 is then preferably repeated, such that substantially the entirety of the communication session is displayed. As shown in step 6, each data packet of the communication session is examined to see if the call time is over. If the individual session has not completed, preferably step 5 is repeated. Alternatively and preferably, if the call time is over, then call progress database 80 is searched to see if other communication sessions were recorded within the given time period, as shown in step 7. If there is at least one other such communication session, then preferably the method of FIG. 5 is repeated, starting from step 2.

Figure 6:
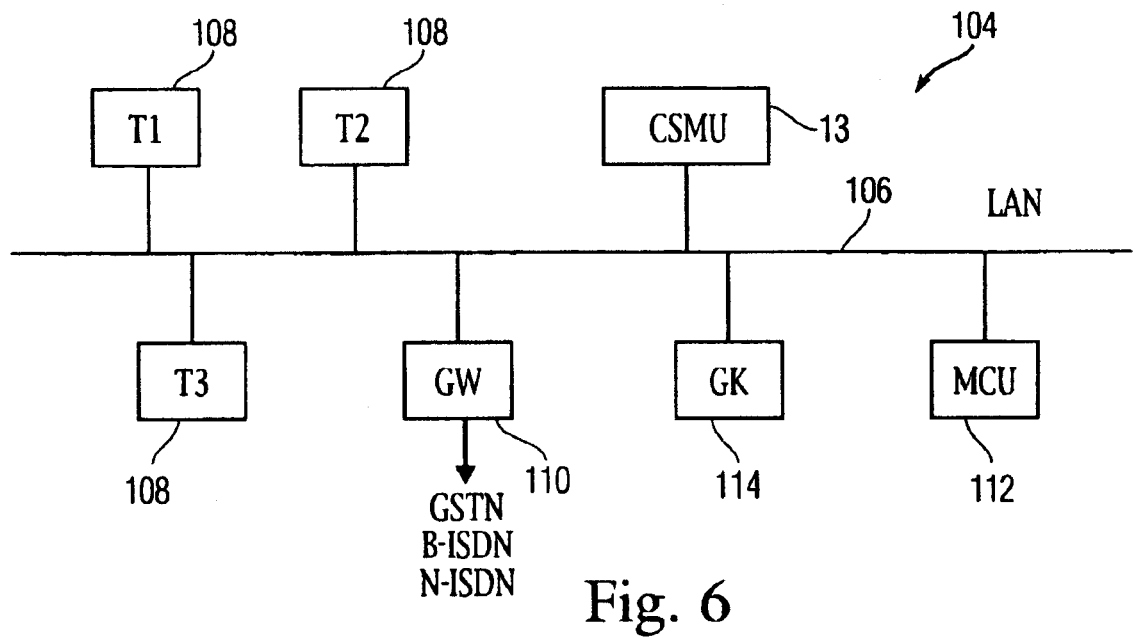
FIG. 6 is a schematic block diagram of an exemplary first embodiment of a basic system using the communication session monitoring system of FIGS. 1 and 2 according to the present invention.
Figure 7:
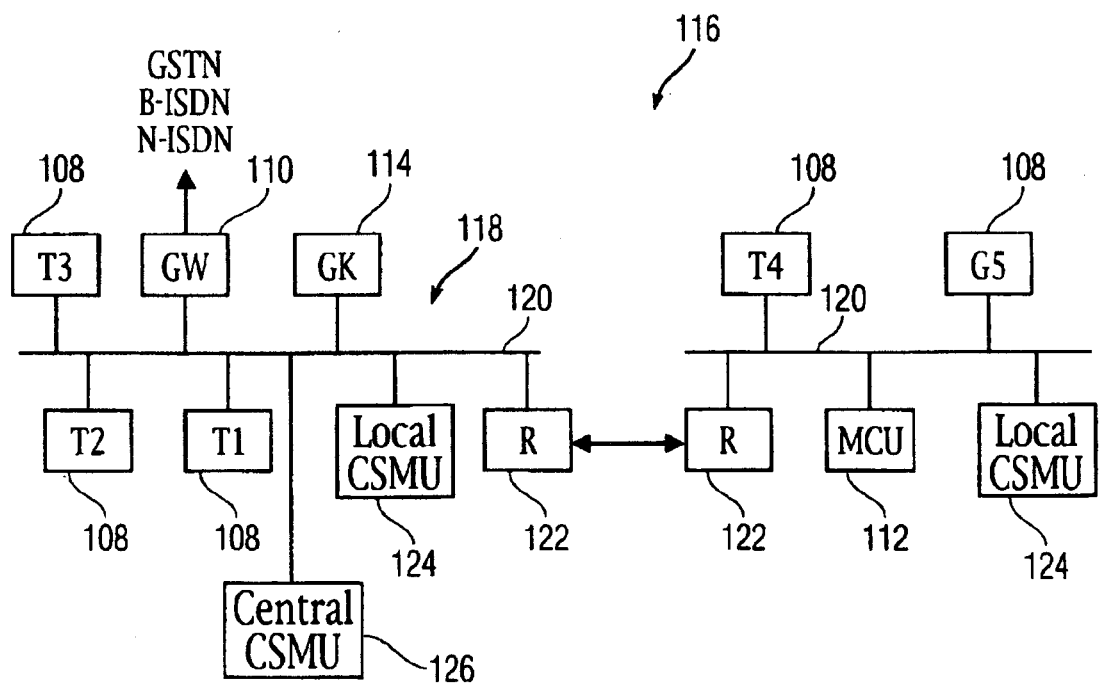
FIG. 7 is a schematic block diagram of an exemplary second embodiment of a zone system according to the present invention.

According to preferred embodiments of the present invention, several configurations of the computer logging system are possible, examples of which are shown in FIGS. 6 and 7.

According to a first embodiment of the system of the present invention, shown in FIG. 6, a typical basic configuration system 104 includes a single communication session management unit 13, substantially as shown in FIGS. 1 and 2, according to the present invention. Communication session management unit 13 manages communication in a stand-alone intranet such as a LAN 106. LAN 106 is connected both to communication session management unit 13 and to a plurality of terminals 108, designated as "T1", "T2" and so forth, which follow the H.323 protocol. Each terminal 108 is an endpoint on LAN 106 which provides for real-time, two-way communications with another terminal 108, a gateway 110, or a multipoint control unit 112. This communication consists of control, indications, audio streams, video streams, and/or data. Terminal 108 is optionally only capable of providing such communication for audio only, audio and data, audio and video, or audio, data and video. As noted previously in the "Description of the Background Art" section, the H.323 entity could be a terminal which is capable of providing audio and/or video communication as a "LAN telephone", but could also be a stand-alone audio or video telephone.

Gateway 110 (GW) is constructed according to H.323 and is an endpoint on LAN 106 which provides for real-time, two-way communications between terminals 108 on LAN 106 and other suitable terminals on a WAN (not shown), or to another such Gateway (not shown). Other suitable terminals include those complying with Recommendations H.310 (H.320 on B-ISDN), H.320 (ISDN), H.321 (ATM), H.322 (GQOS-LAN), H.324 (GSTN), H.324M (Mobile), and V.70 (DSVD).

Multipoint Control Unit (MCU) 112 is an endpoint on LAN 106 which enables three or more terminals 108 and gateways 110 to participate in a multipoint conference.

Preferably, system 104 also features a gatekeeper (GK) 114, which is an H.323 entity on LAN 106 which provides address translation and controls access to LAN 106 for terminals 108, gateways 110 and MCUs 112. Gatekeeper 114 may also provide other services to terminals 108, gateways 10 and MCUs 112 such as bandwidth management and locating gateways 110. Preferably, gatekeeper 114 enables the IP address of terminals 108 on LAN 106 to be determined, such that the correct IP address can be determined "on the fly".

In addition, LAN 106 may support non audio visual devices for regular T.120 data applications such as electronic whiteboards, still image transfer, file exchange, database access, etc.

In basic system 104, a single, stand-alone communication session management unit 13 is used for monitoring, logging and retrieval of all audio and/or visual calls either between any two or more terminals 108 attached to LAN 106 or any call to which one or more of these terminals 108 is a party.

However, for the preferred embodiment of the system of FIG. 6 which includes gatekeeper 114, as well as for the system of FIG. 7, once the communication session has been opened, preferably RAS control module 84 also performs RAS signaling between the management control module and NIC 16 where necessary for the configuration of the system. Such signaling uses H.225.0 messages to perform registration, admissions, bandwidth changes, status, and disengage procedures between endpoints and gatekeepers. These messages are passed on a RAS Signaling Channel, which is independent from the Call Signaling Channel and the H.245 Control Channel. H.245 open logical channel procedures are not used to establish the RAS Signaling Channel. In LAN environments which contain a Gatekeeper (a Zone), the RAS Signaling Channel is opened between the endpoint and the Gatekeeper. The RAS Signaling Channel is opened prior to the establishment of any other channels between H.323 endpoints.

FIG. 7 shows a second embodiment of the system of the present invention as a zone configuration system 116. A zone 118 is the collection of all terminals (Tx) 108, gateways (GW) 110, and Multipoint Control Units (MCU) 112 managed by a single gatekeeper (GK) 114. Zone 118 includes at least one terminal 108, but does not necessarily include one or more gateways 110 or MCUs 112. Zone 118 has only one gatekeeper 114 as shown. However, in the preferred embodiment shown, zone 118 is preferably independent of LAN topology and preferably includes multiple LAN segments 120 which are connected using routers (R) 122 as shown or other similar devices.

Each monitored LAN segment 120 has a local communication management unit 124 according to the present invention, of which two are shown. A central management unit 126 according to the present invention controls all local communication management units 124. In addition to centralized database and control services, central management unit 126 can be used for the real-time monitoring and off-line restoration of audio and/or video communication sessions from a single point. Central management unit 126 is optionally and preferably either a dedicated unit similar in structure to local communication management units 124 but without the storage capability, or central management unit 126 is alternatively and preferably integrated with local communication management units 124 to provide the functionality of both local communication management unit 124 and central management unit 126 in a single station. Local communication management units 124 are preferably either communication management units 13 substantially as described in FIGS. 1 and 2, or alternatively and preferably are simpler units which lack the capability to retrieve and display a communication session locally.

In still another preferred embodiment of the present invention (not shown), multi-user operation based on Client/Server architecture is preferably supported for basic system 104 and zone system 116. An unlimited number of "Client" stations may be connected anywhere on the LAN, providing users with management and monitoring/retrieval capabilities determined by the authorization level of each specific user.

It will be appreciated that the above descriptions are intended only to serve as examples, and that many other embodiments are possible within the spirit and the scope of the present invention.

We claim:

1. In a communication system including computer network-based telephones, a method for restoring at least a portion of a telephone communication session, the method comprising:

(a) receiving data packets transmitted over a computer network;

(b) analyzing a data portion of the data packets to determine the telephone communication session to which the data packets belong;

(c) storing audio or video data contained in the data packets;

(d) restoring the portion of the telephone communication session from the audio or video data contained in the data packets;

(e) providing a terminal having a user interface, a data entry device and a display unit suitable for outputting audio data, video data, or both audio and video; and (f) outputting the portion of the telephone communication session using the display unit.

2. The method of claim 1, further comprising steps of receiving a command via the data entry device and using the command to determine filtering information, wherein the storing step stores audio or video data contained in data packets that satisfy the filtering information.

3. The method of claim 1, wherein the restoring step includes the steps of obtaining time-stamp data from each of the data packets and re-assembling the telephone communication session using the time-stamp data to maintain an overall timing among the data packets that comprise the telephone communication session.

4. The method of claim 3, wherein the step of obtaining time-stamp data comprises examining the data packets to determine a time stamp for each of the data packets.

5. The method of claim 1, wherein the outputting step further comprises the step of displaying any video data included in the restored portion of the communication session on a computer monitor, a video monitor or a display screen.

6. The method of claim 1, wherein the outputting step further comprises the step of producing any audio data included in the restored portion of the communication session through an earphone or a loudspeaker.

7. The method of claim 1, including the additional steps of determining which data packets comprise the portion of the telephone communication session on the basis of information extracted from a header of the data packets.

8. The method of claim 7, wherein the information extracted from the header includes one of a source IP address and a destination IP address.

9. The method of claim 1, wherein the restoring step occurs at the terminal.

10. The method of claim 1, wherein the restoring step occurs remote from the terminal.

11. The method of claim 1, further comprising the step of receiving a request issued from the terminal, wherein the outputting step is in response to the request.

* * * * *

UNITED STATES PATENT AND TRADEMARK OFFICE
CERTIFICATE OF CORRECTION

PATENT NO. : 6,880,004 B2
DATED : April 12, 2005
INVENTOR(S) : Mordechai Nisani et al.

It is certified that error appears in the above-identified patent and that said Letters Patent is hereby corrected as shown below:

<u>Title page,</u>
Item [75], Inventors, should read -- Mordechai, Nisani, Guildford (UK); Eitan Bar, Even Yehuda (IL) --

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,880,004 B2
APPLICATION NO. : 10/962679
DATED : April 12, 2005
INVENTOR(S) : Mordechai Nisani It is certified that error appears in the above-identified patent and that said Letters Patent is hereby corrected as shown below:

Title page,
Item [75], Inventors, should read -- Mordechai Nisani, Guildford (UK); Eitan Bar, Even Yehuda (IL) --

This certificate supersedes Certificate of Correction issued July 5, 2005.

Signed and Sealed this

Thirtieth Day of October, 2007

JON W. DUDAS
*Director of the United States Patent and Trademark Office*

(12) INTER PARTES REEXAMINATION CERTIFICATE (0090th)
United States Patent
Nisani et al.

(10) Number: US 6,880,004 C1
(45) Certificate Issued: *Aug. 11, 2009

(54) METHOD FOR RESTORING A PORTION OF A COMMUNICATION SESSION TRANSMITTED OVER A COMPUTER NETWORK

(75) Inventors: Mordechai Nisani, Guildford (GB); Eitan Bar, Even Yehuda (IL)

(73) Assignee: STS Systems Ltd., Ra'Anana (IL)

Reexamination Request:
No. 95/000,298, Sep. 12, 2007

Reexamination Certificate for:
Patent No.: 6,880,004
Issued: Apr. 12, 2005
Appl. No.: 10/962,679
Filed: Oct. 13, 2004

(*) Notice: This patent is subject to a terminal disclaimer.

Certificate of Correction issued Jul. 5, 2005.

Certificate of Correction issued Oct. 13, 2007.

Related U.S. Application Data

(63) Continuation of application No. 09/664,755, filed on Sep. 19, 2000, now abandoned, which is a continuation-in-part of application No. 09/140,453, filed on Aug. 26, 1998, now Pat. No. 6,122,665.

(51) Int. Cl.
*G06F 15/16* (2006.01)
*G06F 15/173* (2006.01)

(52) U.S. Cl. ............ 709/224; 379/88.01; 709/204
(58) Field of Classification Search .......... None
See application file for complete search history.

(56) References Cited

U.S. PATENT DOCUMENTS

| 4,866,704 A | 9/1989 | Bergman |
| 4,914,586 A | 4/1990 | Swinehart et al. |
| 5,101,402 A | 3/1992 | Chiu et al. |
| 5,351,243 A | 9/1994 | Kalkunte |
| 5,430,709 A | 7/1995 | Galloway |
| 5,440,624 A | 8/1995 | Schoof, II |
| 5,689,641 A | 11/1997 | Ludwig |
| 5,717,879 A | 2/1998 | Moran et al. |
| 5,719,786 A | 2/1998 | Nelson et al. |
| 5,742,833 A | 4/1998 | Dea |
| 5,764,901 A | 6/1998 | Skarbo et al. |
| 5,787,253 A | 7/1998 | McCreery et al. |
| 5,930,752 A | 7/1999 | Kawaguchi et al. |
| 6,047,060 A | 4/2000 | Fedorov et al. |
| 6,108,782 A | 8/2000 | Fletcher et al. |
| 6,233,256 B1 | 5/2001 | Dieterich et al. |
| 6,282,269 B1 | 8/2001 | Bowater et al. |
| 6,288,739 B1 | 9/2001 | Hales et al. |
| 6,320,588 B1 | 11/2001 | Palmer et al. |
| 6,356,294 B1 | 3/2002 | Martin et al. |
| 6,404,857 B1 | 6/2002 | Blair et al. |
| 6,418,214 B1 | 7/2002 | Smythe et al. |
| 6,538,684 B1 | 3/2003 | Sasaki et al. |
| 6,542,602 B1 | 4/2003 | Elazar |

FOREIGN PATENT DOCUMENTS

EP  0 841 832 A2  5/1998

(Continued)

OTHER PUBLICATIONS

MBone Video Conference Recorder MAN Page, Nov. 5, 1995.

(Continued)

*Primary Examiner*—Ovidio Escalante

(57) ABSTRACT

Restoring at least a portion of a telephone communication session, in which at least the following occur. Data packets transmitted over a computer network are received. Audio or video data contained in the data packets is stored. The portion of the telephone communication session from the audio or video data contained in the data packets is restored. A terminal having a user interface, a data entry device and a display unit suitable for outputting audio data, video data, or both audio and video is provided. The portion of the telephone communication session is output using the display unit.

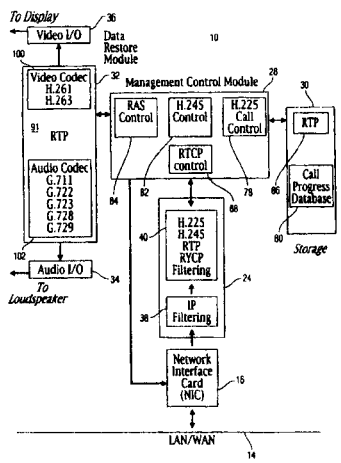

U.S. PATENT DOCUMENTS

| | | |
|---|---|---|
| 6,668,044 B1 | 12/2003 | Schwartz et al. |
| 6,690,663 B1 | 2/2004 | Culver |
| 6,959,079 B2 | 10/2005 | Elazar |
| 7,263,526 B1 | 8/2007 | Busey et al. |
| 2001/0043697 A1 | 11/2001 | Cox et al. |

FOREIGN PATENT DOCUMENTS

| | | |
|---|---|---|
| EP | 1108239 B1 | 4/2005 |
| EP | 1319299 B1 | 12/2005 |
| JP | 05-145561 | 6/1993 |
| JP | 07-107157 | 4/1995 |
| JP | 08-307456 | 11/1996 |
| WO | WO 96/37979 | 11/1996 |
| WO | WO-97 461674 A | 11/1997 |
| WO | WO 98/26541 | 6/1998 |
| WO | WO 99/43137 | 8/1999 |
| WO | WO-00 28425 A | 5/2000 |
| WO | WO-00 52916 A | 9/2000 |

OTHER PUBLICATIONS

Holfelder, W., "MBone VCR—Video Conference Recording on the MBone" in ACM Multimedia 95–Electronic Proceedings, 237-8 (Nov.1995).

Holfelder, W., "Interactive Remote Recording and Playback of Multicase Videoconferences," in Interactive Distributed Multimedia Systems and Telecommunications Services, 4th International Workshop, IDMS '97, Darmstadt, Germany, 450–463 (Sep. 10–12, 1997 Proceedings, Steinmetz, R. and Wolf, L. Eds).

Glover, Mark V., "Internetworking: Distance Learning 'To Sea' via Desktop Videoconferencing Tools and IP Multicast Protocols" (Mar. 1998) (unpublished M. Sc. Thesis, Naval Postgraduate School, Monterey, California).

S. Deering, Network Working Group Request for Comments: 1112, "Host Extensions for IP Multicasting," Stanford University, Aug. 1989, pp. 1–17.

Special Master's Report and Recommendation on Claim Construction, *STS Software Systems, Ltd.* v. *Witness Systems, Inc.*, U.S.D.C of Georgia, Atlanta Division, Case No. 1:04–cv–02111–RWS, filed Oct. 10, 2006, pp. 1–46.

Order (for consideration of the Special Master's Report and Recommendation on Claim Construction), *STS Software Systems, Ltd.* v. *Witness Systems, Inc*, U.S.D.C. of Georgia, Atlanta Division, Case No. 1:04–cv–02111–RWS, filed Jan. 16, 2007, pp. 1–2.

F, Baker, Editor, Network Working Group Request for Comments: 1812, "Requirements for IP Version 4 Routers," Cisco Systems, Jun. 1995, p. 1–175.

BSD Sockets Interface Programmer's Guide, Edition 6, HP 9000 Networking, 1997, pp. 1–196.

Civanlar & Cash—AT&T, Internet Engineering Task Force, File: draft–ietf–avt–pointer–00.txt, "RTP Payload Format for Real–Time Pointers," Oct. 4, 1999, pp. 1–5.

Polle T. Zellweger, Douglas B. Terry & Daniel C. Swinehart, An Overview of the Etherphone System and its Applications, Proceedings of the 2nd IEEE Conference on Computer Workstations (Mar. 7-10, 1998) (WSISTS065782–90).

Antonio Ruiz, Voice and Telephony Applications for the Office Workstation, 1st International Conference on Computer Workstations, IEEE Computer Society Press (Nov. 11–14, 1985) WSISTS065806–13)

Daniel C. Swinehart, Telephone Management in the Etherphone System, IEEE/IEICE Global Telecommunications Conference, Tokyo Conference Proceedings, vol. 2 of 3 (1987) (WSISTS065824–30).

D.C. Swinehart, L.C. Stewart & S.M. Ornstein, Adding Voice to an Office Computer Network, IEEE Global Telecommunications Conference, San Diego, California, Conference Record vol. 1 of 3 (Nov. 28–Dec. 1, 1983 (WSISTS065831–39).

Douglas B. Terry, Distributed System Support for Voice in Cedar, Proc. Of Second European SIGOPS Workshop on Distributed Systems (Aug. 1986) (WSISTS065840–42).

David D. Clark, Scott Shenker & Lixia Zhang, Supporting Real–Time Applications in an Integrated Services Packet Network: Architecture and Mechanism, Conference Proceedings on Communications Architectures & Protocols (Aug. 17–20, 1992) (WSISTS066795–807).

Harrick, M. Vin, Polle T. Zellweger, Daniel C. Swinehart & P. Venkat Rangan, Multimedia Conferencing in the Etherphone Environment, IEEE Computer Society Press, vol. 24, Issue 10 (Oct. 1991) (WSISTS066808–18).

Douglas B. Terry & Daniel C. Swinehart, Managing Stored Voice in the Etherphone System, ACM Transactions on Computer Systems, vol. 6, No. 1, ACM 0734–2071/88/ 0200–0003 (Feb. 1988) (WSISTS066919–43).

David R. Boggs, John F. Shoch, Edward A. Taft & Robert M. Metcalfe, Pup: An Internetwork Architecture, Report CSL–79–10, Xerox Palo Alto Research Center (Jul. 1979) (WSISTS066979–7009).

Jonathan B. Postel, Carl A. Sunchine & Danny Cohen, The ARPA Internet Protocol, Computer Networks: The International Journal of Distributed Informatique, vol. 5, No. 4 (Jul. 1981) (WSISTS067291–302).

Mash Research Team, Recoder, at http://web.archive.org/ web/19980209092445/mash.cs.berkeley.edu/mash/software/recorder–usage.html (archived Feb. 9, 1998)(WSISTS023659–660).

Mash Research Team, Player, at http://web.archive.org/web/ 19980209092521/mash.cs.berkeley.edu/mash (archived Feb. 9, 1998)(WSISTS023672–674).

Mash Research Team, Archive Tools Overview (last modified Aug. 30, 1997) at http://web.archive.org/web/ 19980209092409/mash.cs.berkeley.edu/mash/software/archive–usage.html (archived Feb. 9, 1998)(WSISTS024077).

H. Schulzrinne, NEVOT Implementatiaon and Program Structure, Tech. Rep., University of Massachusetts, Amherst (MA), 1996 (WSIST065512–527).

Network Resource Group of Lawrence Berkeley National Labatory, vat–LBNL Audio Conferencing Tool, at http:// web.archive.org/web/19980126183021/www.nrg.ee.lbl.gov/ vat (archived Jan. 26, 1998) )(WSIST023654–658).

H. Schulzrinne, Voice Communication across the Internet: A Network Voice Terminal, Tech. Rep., University of Massachusetts, Amherst (MA), 1992, 34 pages.

A. Schuett, S. Raman, Y. Chawathe, S. McCanne and R. Katz, A Soft State Protocol for Accessing Multimedia Archives, Proc. 8th International Workshop on Network and Operating Systems Support for Digital Audio and video (NOSSDSV), Jul. 1998, 11 pages.

Witness Systems, Inc., Local Patent Rule (LPR) 4.3 Disclosures (including claim chart), submitted to the Court in *STS Software Systems Ltd.* v. *Witness Systems, Inc. et al.*, U.S. District Court, Northern District of Georgia, Atlanta Division, Case. No. 1:04–CV–2111–RWS on Apr. 25, 2005, 36 pages.

Witness Systems, Inc., Supplemental Local Patent Rule (LPR) 4.3 Disclosures, submitted to the Court in *STS Software Systems Ltd.* v. *Witness Systems, Inc. et al.*, U.S. District Court, Northern District of Georgia, Atlanta Division, Case No. 1:04–CV–2111–RWS on Sep. 9, 2005, 19 pages.

Witness Systems, Inc., Second Supplemental Local Patent Rule (LPR) 4.3 Disclosures (including claim chart), submitted to the Court in *STS Software Systems Ltd.* v. *Witness Systems, Inc. et al.*, U.S. District Court, Northern District of Georgia, Atlanta Division, Case No. 1:04–CV–2111–RWS on Jan. 29, 2007, 48 pages.

Witness Systems, Inc., Third Supplemental Local patent Rule (LPR) 4.3 Disclosures (including claim chart), submitted to the Court in *STS Software Systems Ltd.* v. *Witness Systems, Inc. et al.*, U.S. District Court, Northern District of Georgia, Atlanta Division, Case No. 1:04–CV–2111–RWS on Feb. 20, 2007, 20 pages.

Witness Systems, Inc., Fourth Supplemental Local Patent Rule (LPR) 4.3 Disclosures (including claim chart), submitted to the Court in *STS Software Systems Ltd.* v. *Witness Systems, Inc. et al.*, U.S. District Court, Northern District of Georgia, Atlanta Division, Case No. 1:04–CV–2111–RWS on Mar. 22, 2007, 69 pages.

Mash Research Team, vic–video conference, at http://web.archive.org/web/19980209092254/mash.cs.berkeley.edu/mash (archived Feb. 9, 1998) (WSISTS000025–35).

Douglas B. Terry, Daniel C. Swinehart, Managing Stored Voice in the Etherphone System (extended abstract), 1987 (WSISTS065778–9).

Informaton Sciences Institute University of Southern California, RFC: 791 Internet Protocol Darpa Internet Program Protocol Specification, Sep. 1981 (WSISTS065659–703).

D. Cohen, On Packet Speech Communication, in Proceedings of the Fifth International Conference on Computer Communications (Atlanta, Georgia), pp. 271–274, IEEE, Oct. 1980 (WSIST065653–658).

Danny Cohen, A Voice Message System, Computer Message Systems, edited by R.P. Uhlig, Proceeding of the IFIP TC–6 International Symposium on Computer Message Systems, Ottawa, Canada, Apr. 6, 1981, North Holland Publishing Co., pp. 17–28 (WSIST065591–604).

Peter Parnes, Mattias Mattson, Kare Synnes, Dick Schefstrom, mMOD: The Multicast Media–on–Demand System, Lulea University of Technology, Sweden, Mar. 6, 1997 (WSISTS065463–8).

Anders Klemets, The Design and Implementation of a Media on Demand System for WWW in Proc. of the First International Conference on the World–Wide Web, Geneva, 1993 (WISISTS065453–62).

Intel Corporation, Intel Internet Video Phone Trial Applet 2.1: The Problems and Pitfalls of Getting H.323 Safely Through Firewalls (1997), at http://web.archive.org/web/19980425132417//http://support.intel.com/support/videophone/trial21/h323_wpr.html#a18 (archived Apr. 24, 1998) (WSISTS000612–43).

Posting of Michael Pelletier to comp.security.firewalls: Netmeeting through a packet filter, at http://groups–beta.google.com/group/comp.security.firewalls/browse_thread/thread/c14c3ac7d190a58/a4010ede22ff83a0, Jan. 23, 1998, 4 pages.

Blog postings including Brett Eldridge and Brian Connolly to muc.lists.firewalls: MS NetMeeting 2.0 and Raptor Eagle vers. 4.0, at http://groups–beta.google.com/group.muc.lists.firewalls/browse_thread/thread/ec0255b64bf 36ad4?tvc=2, May 2, 1997, 3 pages.

Communications Solutions CTI News, at http://www.tmcnet.com/articles/ctimag/0699/0699news.htm, Jun. 1999 (WSISTS00651–65).

Press Release, RADCOM, Breakthrough Internetworking Application for Latency & Loss Measurements from RADCOM, at http://web.archive.org/web/19980527022443/www.radcom–inc.com/press21.htm (archived May 27, 1998), Apr. 1997 (WSISTS000666–7).

Press Release, RADCOM, New VoIP Testing Applications from RADCOM at www.radcom.com/radcom/about/pr020999.htm, Feb. 9, 1999, 2 pages(WSISTS000668–9).

RADCOM, Supported Protocols, at http://web.archive.org/web/19980527014033/www.radcom–inc.com/protocol.htm (archived May 27, 1998) (WSISTS000670–79).

Press Release, RADCOM, RADCOM Adds Uni 4.0 Signalling and MPEG–II Support to ATM Analysis Solutions, at http://web.archive.org/web/19980527022611/www.radcom–inc.com/press13.htm (archived May 27, 2998), Nov. 1996 (WSISTS000680).

David Willis, Voice Over IP, The Way It Should Be, Network Computing, at http://www.nwc.com/1001/1001ws12.html, Jan. 11, 1999 (WSISTS00681–685).

David Willis, Hear it for yourself: Audio Samples from our H.323 test, Network Computing, at http://www.nwc.com/1001/1001ws2.html, Jan. 11, 1999 (WSISTS000686–692).

RADCOM, Prism200 Multiport WAN/LAN/ATM Analyzer, at http://web.archive.org/web/19980527020144/www.radcom–inc.com/pro–pl.htm (archived May 27, 1998) (WSISTS00693–695).

The AG Group, Inc. User Manual: Etherpeek Ethernet Network Software Analysis, 1997 (WSISTS00719–886).

Screen capture of EtherPeek Protocol Description: Cornell University SeeMe Protocol (WSISTS000887–8).

Robert Kohlhepp, AG Group's Skyline/Satellite Combination Offers Bird's Eye View of Netwrok Traffic, Network Computing, at http://ibg.networkcomputing.com/612/612skyline.html (WSISTS000889–895).

Mel Beckman, See and hear your network, at http://web.archive.org/web/19990224183147/macworld.zdnet.com/pages/june.96/Reviewes.2144.html (archived Feb. 24, 1999) (WSISTS000896–898).

AG Group, Inc. About Skyline/Satellite, at http://web.archive.org/web/19980206033053/www.aggroup.com/skyline (archived Feb. 6, 1998) (WSISTS000899).

Check Point, Supported Applications, at http://web.archive.org/web/19980212233542/www.checkpoint.com/products/technology/index.html (archived Feb. 12, 1998) (WSISTS00900–905).

Posting of Dameon D. Welch–Abernathy, Re: [fw1–wizards] tcpdump for solaris 2.6, at http://oldfaq.phoneboy.com/gurus/200007/msg00081.html, Jul. 18, 2000 (WSISTS000906–7).

Check Point, Stateful Inspection in Action, at http://web.archive.org/web/19980212235911/www.checkpoint.com/products/technology/page2.html (archived Feb. 12, 1998) (WSISTS000908-911).

Check Point, Check POint FireWall-1: Extensible Stateful Inspection at http://web.archive.org/web/19980212235917/www.checkpoint.com/products/technology/page3.html (archived Feb. 12, 1998) (WSISTS000912-914).

RADCOM, PrismLite: Portable WAN/LAN/ATM Protocol Analyzer, at http://web.archive.org/web/19980527020156/www.radcom-inc.com/pro-p2.htm (archived May 27, 1998) (WSISTS000915-917).

David Simpson, Viewing RTPDump Files, at http://bmrc.berkeley.edu/~davesimp/viewingNotes.html (last modified Oct. 12, 1996) (WSISTS000918).

S. Waldbusser, RFC 1757 Remote Network Monitoring Management Information Base, at http://www.faqs.org/rfcs/rfc1757.html, Feb. 1995 (WSISTS000919-983).

Microsoft Corporation, GFF Format Summary: Microsoft RIFF, at http://netghost.narod.ru/gff/graphics/summary/micriff.htm, 1996 (WSISTS0001010-14).

Suchitra Raman & Angela Schuett, On-demand Remote Playback, (Paper, Department of EECS, University of California at Berkley), 1997 (WSISTS000039-48).

McCanne et al., A New Architecture for User-level Packet Capture Lawrence Berkeley Laboratory (published Dec. 19, 1992).

Foo et al., An Approach to Real-Time Voice Communications over the Internet. Nanyang Technological University (published 1996).

Jeffrey C. Mogul, Efficient Use of Workstations for Passive Monitoring of Local Area networks. WRL Research Report 90/5 (published Jul. 1990).

vat—LBNL Audio Conferencing Tool http://web.archive.org/web/20050328083425/www-nrg.ee.lbl.gov/vat/; (published latest by Jan. 26, 1998).

vic—video conferencing http://web.archive.org/web/19980209092254/mash.cs.berkeley.edu/mash/software/usage/vic.html; (published latest by Feb. 9, 1998).

Release, Check Point Firewall-I Version 4.0 Establishes New Benchmark for Easy Deployment of Virtual Private Networks, http://web.archive.org/web/20000310111918/www.checkpoint.com/press/1998/version0504.html (published 2000).

Telecommunication Standardization Sector of International Telecommunication Union, Recommendation H.245 Control Protocol for Multimedia Communication, Feb. 1998 (WSISTS000332-611).

Telecommunication Standardization Sector of International Telecommunication Union, Recommendation H.225 Call Signaling Protocols and Media Stream Packetization for Packet-Based Multimedia Communication Systems, Feb. 1998 (WSISTS000177-331).

Telecommunication Standardization Sector of International Telecommunication Union, Recommendation H.323 Packet-Based Multimedia Communications Systems, Feb. 1998 (WSISTS000049-176).

Dr. Barry Wessler, Rebuttal Expert Report, submitted to the Court in STS Software Systems Ltd. v. Witness Systems, Inc. et al., U.S. District Court, Northern District of Georgia, Atlanta Division, Case No. 1:04-CV-2111-RWS on Nov. 6, 2007, 38 pages.

Witness Systems, Inc., Expert Report of Danny Cohen on Invalidity (28 pgs) with claim chart Exhibit C (44 pgs), submitted to the Court in STS Software Systems Ltd. v. Witness Systems, Inc. et al., U.S. District Court, Northern District of Georgia, Atlanta Division, Case No. 1:04-CV-2111-RWS on Sep. 19, 2007.

Witness Systems, Inc., Rebuttal Expert Report of Dr. Danny Cohen (53 pages) with claim chart Exhibit C (44 pgs), submitted to the Court in STS Software Systems Ltd. v. Witness Systems, Inc. et al., U.S. District Court, Northern District of Georgia, Atlanta Division, Case No. 1:04-CV-2111-RWS on Nov. 20, 2007.

Witness Systems, Inc., Expert Report of Stephen L. Casner on Invalidity (39 pgs), with claim chart exhibits (Exhibit E—20 pgs; Exhibit F—24 pgs; Exhibit G—20 pgs; Exhibit H—41 pgs; Exhibit I—19 pgs; Exhibit J—20 pgs; Exhibit K—29 pgs; and Exhibit L—30 pgs), submitted to the Court in STS Software Systems Ltd. v. Witness Systems, Inc. et al., U.S. District Court, Northern District of Georgia, Atlanta Division, Case No. 1:04-CV-2111-RWS on Sep. 21, 2007.

Witness Systems, Inc., Rebuttal Export Report of Stephen Casner (75 pgs) with claim chart exhibits (Exhibit E—17 pgs; Exhibit F—21 pgs; Exhibit H—38 pgs; and Exhibit L—26 pgs), submitted to the Court in STS Software Systems Ltd. v. Witness Systems, Inc. et al., U.S. District Court, Northern District of Georgia, Atlanta Division, Case No. 1:04-CV-2111-RWS on Nov. 20, 2007.

Witness Systems, Inc., Expert Report of Dr. David D. Clark on Invalidity (60 pgs), with claim chart exhibits (Exhibit E—38 pgs; Exhibit F—23 pgs; Exhibit G—37 pgs; Exhibit H—32 pgs;Exhibit I—62 pgs; Exhibit J—39 pgs; Exhibit K—41 pgs; Exhibit L—43 pgs; Exhibit M—19 pgs; Exhibit N—94 pgs; Exhibit O—61 pgs; Exhibit P—pgs; Exhibit Q—13 pgs; Exhibit R—22 pgs; Exhibit S—50 pgs; Exhibit T—24 pgs; Exhibit U—66 pgs; Exhibit V—41 pgs; and Exhibit W—36 pgs), submitted to the Court in STS Software Systems Ltd. v. Witness Systems, Inc. et al., U.S. District Court, Northern District of Georgia, Atlanta Division, Case No. 1:040-CV-2111-RWS on Sep. 21, 2007.

Witness Systems, Inc., Rebuttal Export Report of Dr. David Clark (111 pgs), with claim chart exhibits (Exhibit E—35 pgs; Exhibit J—36 pgs; Exhibit O—58 pgs; Exhibit P—12 pgs; Exhibit Q—12 pgs; Exhibit R—19 pgs; Exhibit S—47 pgs; Exhibit U—63 pgs; Exhibit V—37 pgs; and Exhibit W—32 pgs) , submitted to the Court in STS Software Systems Ltd. v. Witness Systems, Inc. et al., U.S. District Court, Northern District of Georgia, Atlanta Division, Case No. 1:04-CV-2111-RWS on Nov. 20, 2007.

Witness Systems, Inc., Expert Report of Dr. Jeffrey S. Vitter on Valildity (including claim chart), submitted to the Court in Nice Systems, Inc. and Nice Systems Ltd. v. Witness Systems, Inc. et al., U.S. District Court, for the district of Delaware, Case No. 06-311-JJF on Dec. 21, 2007 (85 pgs).

Witness Systems, Inc., Expert Report of John Henits on Validity Issues, submitted to the Court in Nice Systems, Inc. and Nice Systems Ltd. v. Witness Systems, Inc. et al., U.S. District Court, for the District of Delaware, Case No. 06-311-JJF on Dec. 31, 2007 (99 pgs).

Ando et al., Architecture of Internet Telephony Software, VocaLink-Soft, NTT R&D, vol. 46, (1997).

US 6,880,004 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 8 is confirmed.

Claims 1, 3, 4, 5, 6, 7, 9, 10 and 11 are now disclaimed.

Claim 2 is cancelled.

New claim 12 is added and determined to be patentable.

*12. In a communication system including computer network-based telephones, a method for restoring at least a portion of a telephone communication session, the method comprising:*
  *(a) receiving data packets transmitted over a computer network;*
  *(b) analyzing a data portion of the data packets to determine the telephone communication session to which the data packets belong;*
  *(c) storing audio or video data contained in the data packets;*
  *(d) restoring the portion of the telephone communication session from the audio or video data contained in the data packets;*
  *(e) providing a terminal having a user interface, a data entry device and a display unit suitable for outputting audio data, video data, or both audio and video;*
  *(f) outputting the porton of the telephone communication session using the display unit; and*
  *(g) determining which data packets comprise the portion of the telephone communication session on the basis of information extracted from a header of the data packets;*
  *wherein the data packets include both a source IP address associated with a terminal and a destination IP address associated with a terminal, and wherein the informaton extracted from the header includes one of a source IP address and a destination IP address.*

\* \* \* \* \*